(12) United States Patent
Takeda et al.

(10) Patent No.: US 11,743,094 B2
(45) Date of Patent: Aug. 29, 2023

(54) TERMINAL, BASE STATION, AND COMMUNICATION METHOD FOR ARRANGING A PERIODIC BLOCK

(71) Applicant: NTT DOCOMO, INC., Tokyo (JP)

(72) Inventors: Daiki Takeda, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/621,589

(22) PCT Filed: Jun. 16, 2017

(86) PCT No.: PCT/JP2017/022272
§ 371 (c)(1),
(2) Date: Dec. 11, 2019

(87) PCT Pub. No.: WO2018/229964
PCT Pub. Date: Dec. 20, 2018

(65) Prior Publication Data
US 2020/0119966 A1    Apr. 16, 2020

(51) Int. Cl.
*H04L 27/26* (2006.01)
*H04W 28/06* (2009.01)
(Continued)

(52) U.S. Cl.
CPC ........ *H04L 27/2666* (2013.01); *H04B 7/0811* (2013.01); *H04L 27/26025* (2021.01); *H04W 28/06* (2013.01); *H04W 56/001* (2013.01); *H04W 72/0446* (2013.01); *H04W 74/006* (2013.01); *H04W 74/08* (2013.01); *H04W 88/08* (2013.01); *H04B 14/002* (2013.01)

(58) Field of Classification Search
CPC . H04W 56/001; H03M 13/09; H04L 27/2666; H04L 27/26025; H04B 7/0811; H04B 14/002
See application file for complete search history.

(56) References Cited

U.S. PATENT DOCUMENTS 8,553,604 B2    10/2013  Kazmi et al.
10,701,659 B2    6/2020  Frenger et al.
(Continued)

FOREIGN PATENT DOCUMENTS

CA    3056908 A1    9/2018
KR    20180091320 A    8/2018
WO    2018/165927 A1    9/2018

OTHER PUBLICATIONS

International Search Report issued in PCT/JP2017/022272 dated Aug. 1, 2017 (5 pages).
(Continued)

*Primary Examiner* — Salvador E Rivas
(74) *Attorney, Agent, or Firm* — Osha Bergman Watanabe & Burton LLP

(57) ABSTRACT

A base station apparatus communicates with a plurality of user apparatuses and includes a transmitting unit that transmits a plurality of radio signals to the plurality of user apparatuses, and a control unit that arranges a periodic block including a synchronization signal and system information in one or more radio signals of the plurality of radio signals based on a subcarrier spacing of the radio signal.

7 Claims, 15 Drawing Sheets

(51) Int. Cl.
*H04W 56/00* (2009.01)
*H04W 72/0446* (2023.01)
*H04W 74/00* (2009.01)
*H04W 74/08* (2009.01)
*H04W 88/08* (2009.01)
*H04B 7/08* (2006.01)
*H04B 14/00* (2006.01)

(56) References Cited

U.S. PATENT DOCUMENTS

| | | | |
|---|---|---|---|
| 2004/0116151 A1 | 6/2004 | Bosch et al. | |
| 2008/0084789 A1 | 4/2008 | Altman | |
| 2008/0095108 A1 | 4/2008 | Malladi et al. | |
| 2009/0129457 A1 | 5/2009 | Akahori | |
| 2009/0149187 A1* | 6/2009 | Miki | H04L 5/0058 455/450 |
| 2009/0220027 A1 | 9/2009 | Halfmann et al. | |
| 2009/0316569 A1 | 12/2009 | Lele et al. | |
| 2014/0205035 A1 | 7/2014 | Ko et al. | |
| 2014/0206341 A1* | 7/2014 | Siomina | H04W 36/0085 455/422.1 |
| 2016/0050635 A1* | 2/2016 | Choi | H04L 5/0007 370/254 |
| 2016/0352551 A1 | 12/2016 | Zhang et al. | |
| 2017/0094547 A1* | 3/2017 | Yum | H04W 56/001 |
| 2017/0187499 A1 | 6/2017 | Hwang et al. | |
| 2017/0294994 A1* | 10/2017 | Shor | H04L 5/0007 |
| 2018/0198570 A1 | 7/2018 | Astely et al. | |
| 2019/0036746 A1 | 1/2019 | Hwang et al. | |
| 2019/0116007 A1 | 4/2019 | Yi et al. | |
| 2019/0141659 A1 | 5/2019 | Frenger et al. | |
| 2019/0190687 A1* | 6/2019 | Yi | H04L 27/2628 |
| 2019/0288899 A1 | 9/2019 | Wang et al. | |
| 2019/0357123 A1 | 11/2019 | Jha et al. | |
| 2019/0380067 A1 | 12/2019 | Rosa et al. | |
| 2020/0028726 A1 | 1/2020 | Karlsson et al. | |
| 2020/0119966 A1 | 4/2020 | Takeda et al. | |
| 2020/0136738 A1 | 4/2020 | Zhang et al. | |
| 2020/0137700 A1 | 4/2020 | Zhang et al. | |
| 2020/0336270 A1 | 10/2020 | Lu et al. | |

OTHER PUBLICATIONS

Written Opinion of the International Searching Authority issued in in PCT/JP2017/022272 dated Aug. 1, 2017 (5 pages).
Intel Corporation; "NR Synchronization Signal Time Indexing"; 3GPP TSG RAN WG1 Meeting RAN1 #88, R1-1702177; Athens, Greece; Feb. 13-17, 2017 (3 pages).
3GPP TS 36.213 V14.2.0; "3rd Generation Partnership Project; Technical Specification Group Radio Access Network; Evolved Universal Terrestrial Radio Access (E-UTRA); Physical layer procedures (Release 14)"; Mar. 2017 (454 pages).
3GPP TS 36.211 V14.2.0; "3rd Generation Partnership Project; Technical Specification Group Radio Access Network; Evolved Universal Terrestrial Radio Access (E-UTRA); Physical channels and modulation (Release 14)"; Mar. 2017 (194 pages).
Ericsson; "SS Burst Set Composition"; 3GPP TSG-RAN WG1 Meeting #88bis, R1-1706008; Spokane, U.S.; Apr. 3-7, 2017 (6 pages).
ZTE, ZTE Microelectronics; "Composition of SS block, burst and burst set"; 3GPP TSG RAN WG1 Meeting #88bis, R1-1704358; Spokane, USA; Apr. 3-7, 2017 (10 pages).
Nokia, Alcatel-Lucent Shanghai Bell; "SS Block Composition, SS Burst Set Composition and SS Time Index Indication"; 3GPP TSG-RAN WG1 Meeting #88bis, R1-1705837; Spokane, WA, USA; Apr. 3-7, 2017 (13 pages).
Partial Supplementary European Search Report issued in counterpart European Patent Application No. 17908552.7, dated Oct. 26, 2020 (18 pages).
Samsung; "NR-PBCH designs"; 3GPP TSG RAN WG1 #88, R1-1702905; Athens, Greece; Feb. 13-17, 2017 (13 pages).
Nokia et al.; "SS Bandwidth, Numerology and Multiplexing"; 3GPP TSG RAN WG1 Meeting #88, R1-1703090; Athens, Greece; Feb. 13-17, 2017 (6 pages).
Convida Wireless et al.; "Discussion of PBCH Transmission in NR"; 3GPP TSG RAN WG1 Meeting #87, R1-1613008; Reno, USA; Nov. 14-18, 2016 (4 pages).
Huawei, HiSilicon; "Discussion on SS burst set composition and SS block time index indication"; 3GPP TSG RAN WG1 Meeting #88bis, R1-1705052; Spokane, USA; Apr. 3-7, 2017 (9 pages).
Extended European Search Report issued in counterpart European Patent Application No. 17913628.8, dated Nov. 30, 2020 (12 pages).
NTT Docomo, Inc.; "Discussion on SS block composition and SS burst set composition"; 3GPP TSG RAN WG1 Meeting #89, R1-1708437; Hanzhou, P.R. China; May 15-19, 2017 (5 pages).
LG Electronics; "Discussion on SS block, SS burst set composition and time index indication"; 3GPP TSG RAN WG1 Meeting #88bis, R1-1704862; Spokane, USA; Apr. 3-7, 2017 (8 pages).
ETRI; "NR SS block and burst set composition"; 3GPP TSG RAN WG1 Meeting #88bis, R1-1704944; Spokane, USA; Apr. 3-7, 2017 (5 pages).
Qualcomm Incorporated; "SS block and SS burst set composition consideration"; 3GPP TSG-RAN WG1 NR #89, R1-1708569; Hangzhou, P.R. China; May 15-19, 2017 (5 pages).
Office Action issued in Korean Application No. 10-2019-7032249; dated Jan. 20, 2021 (10 pages).
Office Action issued in the counterpart Japanese Patent Application No. 2019-516354, dated Jun. 23, 2020 (7 pages).
Sony; "On NR synchronization signal design"; 3GPP TSG RAN WG1 AH_NR Meeting, R1-1700665; Spokane, USA; Jan. 16-20, 2017 (4 pages).
Extended European Search Report issued in counterpart European Patent Application No. 17908552.7, dated Jan. 20, 2021 (21 pages).
Nokia et al.; "On Requirements and Design of SS Burst Set and SS Block Index Indication"; 3GPP TSG-RAN WG1 Meeting #88, R1-1703092; Athens, Greece; Feb. 13-17, 2017 (15 pages).
Qualcomm Incorporated; "SS block, burst-set composition, and time index indication"; 3GPP TSG-RAN WG1 NR #88bis, R1-1705565; Spokane, USA; Apr. 3-7, 2017 (9 pages).
NTT Docomo, Inc.; "Discussion on SS block composition, SS burst set composition and SS block index indication for NR"; 3GPP TSG RAN WG1 Meeting #88bis, R1-1705705; Spokane, USA; Apr. 3-7, 2017 (8 pages).
Office Action issued in the counterpart U.S. Appl. No. 16/609,157, dated Jan. 6, 2021 (25 pages).
Office Action issued in related U.S. Appl. No. 16/609,157, dated Jun. 9, 2021 (21 pages).
Office Action issued in the counterpart U.S. Appl. No. 16/609,157, dated Oct. 14, 2021 (9 pages).
Office Action issued in U.S. Appl. No. 16/609,157; dated Feb. 28, 2022 (18 pages).
Office Action issued in the counterpart Colombian Patent Application No. NC2019/0013174, dated Jun. 13, 2022 (7 pages).
Office Action issued in the counterpart U.S. Appl. No. 16/609,157, dated Aug. 1, 2022 (12 pages).
3GPP TSG RAN WG1 Meeting #89, R1-1707043 "The composition of SS blocks and SS burst sets" ZTE; Hangzhou, China; May 15-19, 2017 (9 pages).
Office Action issued in Chinese Application No. 201780091921.5; dated Aug. 8, 2022 (18 pages).
Office Action in the counterpart Colombian Patent Application No. NC2019/0013174, dated Oct. 6, 2022 (28 pages).
Office Action issued in the counterpart African Patent Application No. AP/P/2019011995, dated Nov. 16, 2022 (5 pages).
United States Office Action in related U.S. Appl. No. 16/609,157, dated Nov. 21, 2022 (14 pages).
Office Action issued in the counterpart Colombian Patent Application No. NC2019/0013174, dated Jan. 30, 2023 (25 pages)
3GPP TR 38.802 V14.0.0; "3rd Generation Partnership Project; Technical Specification Group Radio Access Network; Study on New Radio Access Technology; Physical Layer Aspects (Release 14)"; Mar. 2017 (9 pages)
Office Action issued in counterpart Chinese Patent Application No. 201780090217.8, dated Dec. 28, 2022 (23 pages)

(56) References Cited

OTHER PUBLICATIONS

Office Action issued in the counterpart U.S. Appl. No. 16/609,157, dated Apr. 4, 2023 (17 pages).
Office Action issued in counterpart African Patent Application No. AP/P/2019/011995 dated May 16, 2023 (5 pages).
Office Action issued in the counterpart Chinese Application No. 201780091921.5, dated May 26, 2023 (12 pages).

* cited by examiner

FIG.9

| SCS to transmit SS block | Maximum number of SS blocks per SS burst set periodicity |
|---|---|
| 15 kHz | 4 |
| 30 kHz | 8 |
| 120 kHz | 64 |
| 240 kHz | 64 |

TERMINAL, BASE STATION, AND COMMUNICATION METHOD FOR ARRANGING A PERIODIC BLOCK

TECHNICAL FIELD

The present invention relates to a base station apparatus in a radio communication system.

BACKGROUND ART

The 3GPP (3rd Generation Partnership Project) is contemplating a radio communication scheme called "5G" or "NR (New Radio)" (hereinafter referred to as "NR") in order to further increase system capacity, further increase data transmission rates, further reduce latency in radio sections, and the like. In NR, various radio technologies are being studied in order to satisfy requirements that the latency in a radio section be less than or equal to 1 ms while achieving throughput of at least 10 Gbps.

In NR, during initial access when a user apparatus and a base station apparatus establish a connection, cell detection and cell identification based on a synchronization signal transmitted from the base station apparatus and acquisition of a part of system information necessary for initial access are performed by the user apparatus (see, e.g., Non-Patent Document 1).

Also, in NR, application of different subcarrier spacings (SCSs) in the radio frame structure is being contemplated. For example, SCSs of 15 kHz, 30 kHz, 60 kHz, 120 kHz, and 240 kHz are being contemplated. Also, in NR, use of a wide range of frequency bands ranging from a low frequency band similar to that of LTE (Long Term Evolution) to a high frequency band beyond that of LTE is being contemplated. In particular, because propagation loss increases in high frequency bands, application of narrow-beamwidth beamforming to compensate for the propagation loss is being studied (see, e.g., Non-Patent Document 2).

CITATION LIST

Non-Patent Document

Non-Patent Document 1: 3GPP TS 36.213 V 14.2.0 (2017-03)
Non-Patent Document 2: 3GPP TS 36.211 V 14.2.0 (2017-03)

SUMMARY OF THE INVENTION

Problem to be Solved by the Invention

In NR, a part of the synchronization signal and system information necessary for initial access is mapped to a radio frame as a resource unit called SS block (synchronization signal block) consisting of consecutive OFDM (Orthogonal Frequency Division Multiplexing) symbols. NR contemplates parallel application of different SCSs to radio frames.

Because SS blocks are repeatedly transmitted from the base station apparatus, transmission opportunities for transmitting DL (Downlink)/UL (Uplink) control signals may be obstructed by periods of radio frames with different SCSs in which the SS blocks are mapped.

The present invention has been made in view of the above-described problems of the related art, and it is an object of the present invention to provide a technique for efficiently allocating resources in a radio communication system including a base station apparatus and a user apparatus by configuring the base station apparatus to appropriately arrange a block including a synchronization signal and system information in a radio signal.

Means for Solving Problem

According to the disclosed technology, a base station apparatus that communicates with a plurality of user apparatuses is provided. The base station apparatus includes a transmitting unit that transmits a plurality of radio signals to the plurality of user apparatuses, and a control unit that arranges a periodic block including a synchronization signal and system information in one or more radio signals of the plurality of radio signals based on subcarrier spacings of the one or more radio signals.

Effect of the Invention

According to the disclosed technology, a technique is provided for enabling efficient allocation of resources in a radio communication system including a base station apparatus and a user apparatus by configuring the base station apparatus to appropriately arrange a block including a synchronization signal and system information in a radio signal.

BRIEF DESCRIPTION OF DRAWINGS

FIG. 9 is a diagram showing an example setting of the number of SS blocks set up with respect to each SCS according to an embodiment of the present invention.

MODE FOR CARRYING OUT THE INVENTION

In the following, exemplary embodiments of the present invention are described with reference to the appended drawings. Note that the embodiments described below are merely example embodiments, and implementation of the present invention is not limited to these embodiments.

In operating a radio communication system according to an embodiment of the present invention, existing technology can be used as appropriate. For example, existing LTE technology may be used as the existing technology, but the existing technology is not limited to existing LTE technology. Also, in the present description, unless otherwise specified, the term "LTE" is used in a broad sense to include LTE-Advanced and schemes beyond LTE-Advanced (e.g., NR).

In the embodiment described below, for the sake of convenience, terms for signals and functions used in existing LTE technology, such as SS (Synchronization Signal), PSS (Primary SS), SSS (Secondary SS), PBCH (Physical Broadcast Channel), and the like are used. However, other nomenclature may be used to refer to signals and functions that are similar to the above. Also, note that the above signals and functions used in NR are denoted as NR-SS, NR-PSS, NR-SSS, NR-PBCH, and the like.

In the following, an example overall system configuration and an example initial access as a basic example will be described, and thereafter, Examples 1 and 2 according to embodiments of the present invention will be described. Examples 1 and 2 are based on the basic example. Note, however, that Examples 1 and 2 may be based on a system or initial access other than the basic example.

Basic Example

<System Configuration>

Figure 1:
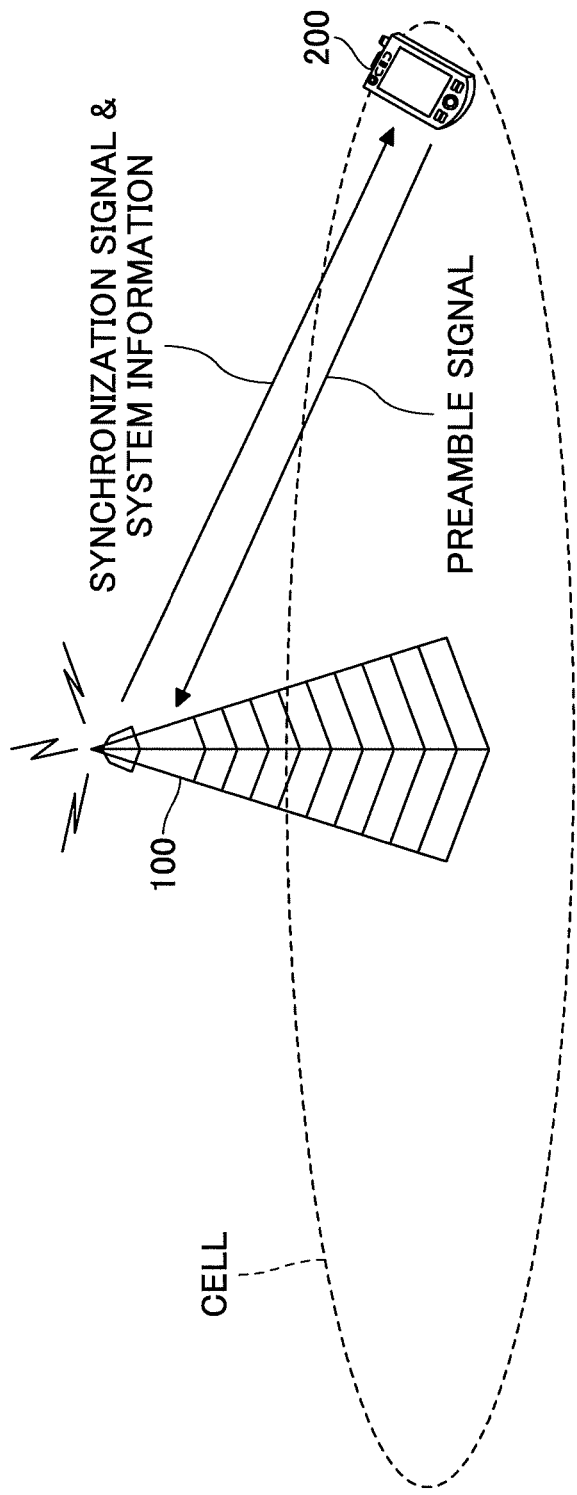
FIG. 1 is a configuration diagram of a radio communication system according to an embodiment of the present invention.

FIG. 1 is a configuration diagram of a radio communication system according to an embodiment of the present invention. As shown in FIG. 1, the radio communication system according to an embodiment of the present invention includes a base station apparatus 100 and a user apparatus 200. Although FIG. 1 shows one base station apparatus 100 and one user apparatus 200, this is merely an example, and the system may include a plurality of each of the above apparatuses.

The base station apparatus 100 is a communication apparatus that provides one or more cells and establishes radio communication with the user apparatus 200. As shown in FIG. 1, the base station apparatus 100 transmits synchronizations signal and system information to the user apparatus 200. The synchronization signals may be NR-PSS and NR-SSS, for example. The system information may be transmitted on the NR-PBCH, for example. Both the base station apparatus 100 and the user apparatus 200 are capable of beamforming and transmitting/receiving signals. The user apparatus 200 is a communication apparatus having a radio communication function, such as a smartphone, a mobile phone, a tablet, a wearable terminal, a communication module for M2M (Machine-to-Machine), and the like. The user apparatus 200 establishes radio connection with the base station apparatus 100 to use various communication services provided by the radio communication system. At the stage of initial access, as shown in FIG. 1, the user apparatus 200 transmits a random access preamble signal to the base station apparatus 100. The random access is performed based on the system information carried by the NR-PBCH received from the base station apparatus 100 as well as system information carried by a NR-PDSCH (Physical downlink shared channel). In the present embodiment, the duplex scheme may be TDD (Time Division Duplex) scheme or FDD (Frequency Division Duplex) scheme.

Also, in the following description, transmitting a signal using a transmitter beam is synonymous with transmitting a signal multiplied by a precoding vector (precoded with a precoding vector). Similarly, receiving a signal using a receiver beam is synonymous with multiplying the received signal by a predetermined weight vector. Also, transmitting a signal using a transmitter beam may be expressed as transmitting a signal at a specific antenna port. Similarly, receiving a signal using a receiver beam may be expressed as receiving a signal at a particular antenna port. The antenna port refers to a logical antenna port defined by the 3GPP standard. Note that the method of forming the transmitter beam and the receiver beam is not limited to the above method. For example, in the base station apparatus 100 and the user apparatus 200 having a plurality of antennas, a method of changing the angle of each antenna may be used, a method combining the use of a precoding vector and changing the angle of an antenna may be used, or some other method may be used. Also, in a high frequency band, a plurality of different transmitter beams may be used, for example. Note that that use of a plurality of transmitter beams is referred to as multi-beam operation, and the use of one transmitter beam is referred to as single beam operation.

<Example Initial Access>

Figure 2:
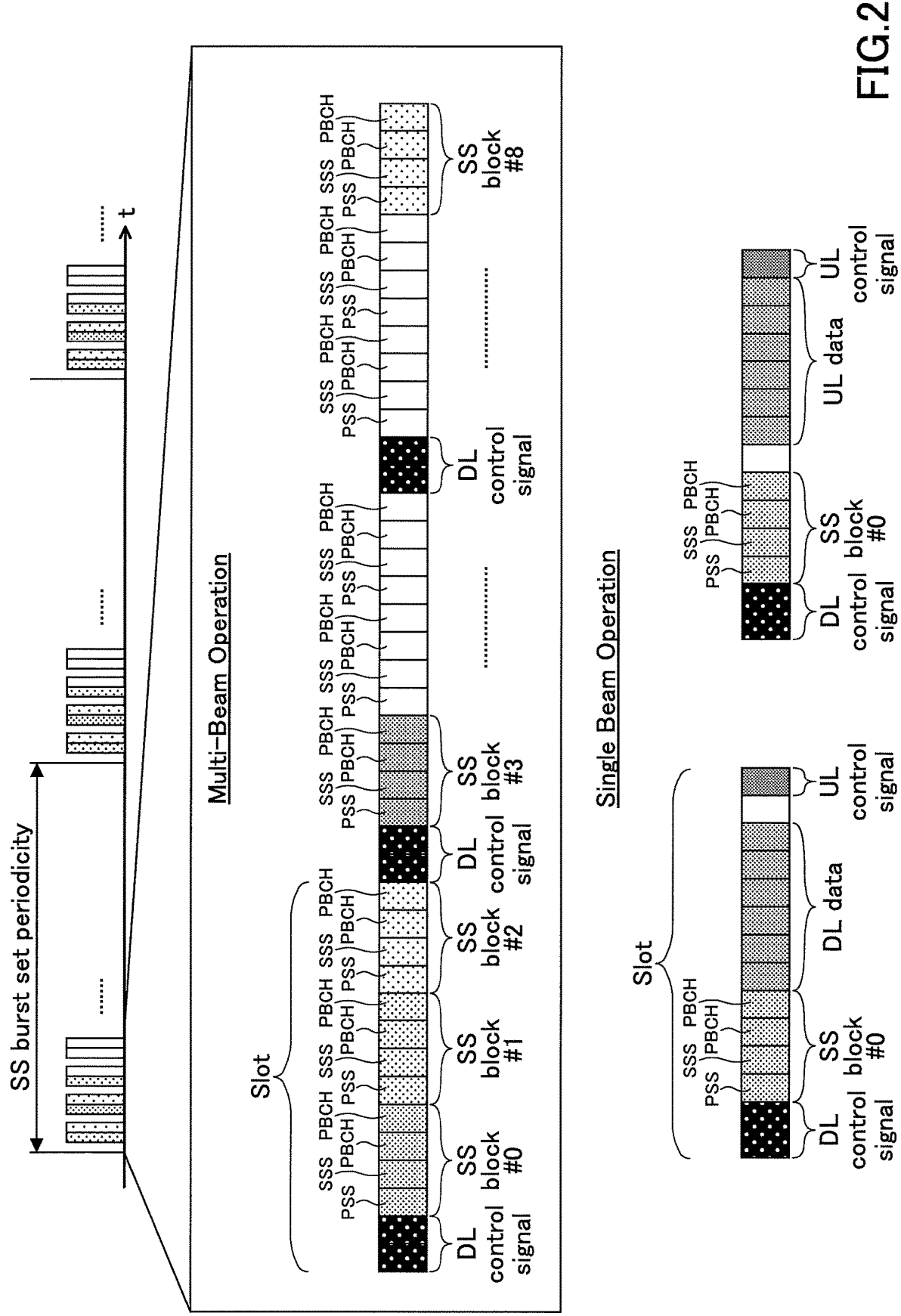
FIG. 2 is a diagram showing a mapping example of SS blocks relating to initial access.

FIG. 2 is a diagram showing a mapping example of SS blocks related to initial access. In FIG. 2, "SS block" is a resource unit including one NR-PSS, one NR-SSS, and one NR-PBCH that are associated with each other. The NR-PSS is a PSS in NR that is transmitted from the base station apparatus 100 to the user apparatus 200 and is used for at least initial time and frequency synchronization. The NR-SSS is a SSS in NR that is transmitted from the base station apparatus 100 to the user apparatus 200 and is used for specifying at least the cell ID (identity). The NR-PBCH is a PBCH in NR that is transmitted from the base station apparatus 100 to the user apparatus 200 after detecting the NR-PSS and the NR-SSS and is a channel for transmitting information for acquiring a part of system information necessary for initial access, such as a system frame number (SFN), and other system information. In the example illustrated in FIG. 2, one SS block consists of a total of four OFDM symbols (hereinafter referred to as "symbol"), the NR-SSS consisting of one symbol, the NR-PSS consisting of one symbol, and the NR-PBCH consisting of two symbols. However, the number of symbols constituting the SS block is not limited to 4 symbols, and may be 5 symbols, 6 symbols, or the like.

In FIG. 2, "SS burst set" is a periodic resource group including one or more SS blocks. "SS burst set periodicity" is the period at which the SS burst set is transmitted from the base station apparatus 100 to the user apparatus 200. The period may be 20 ms, 5 ms, or may be changed as appropriate, for example.

In FIG. 2, "slot" is one unit that defines the structure of a radio frame in NR, and may consist of 14 symbols, for example. Alternatively, one slot may consist of 7 symbols, for example.

FIG. 2 illustrates an example in which one SS burst set includes nine SS blocks in the case of multi-beam operation. In this case, SS blocks #0 to #8 correspond to SS blocks associated with different beams. In the case of single beam operation, one SS burst set includes one SS block. The number of SS blocks that are repeatedly transmitted may be 8 or 64, for example. Also, DL control signals may be arranged in the first several symbols of each slot constituting a radio frame. UL control signals may be arranged in the last several symbols of each slot constituting the radio frame. Also, DL data and UL data may be arranged in the radio frame.

For example, in the case of multi-beam operation, the user apparatus 200 detects and acquires a SS block from among the SS blocks #0 to #8 and uses the resources associated with the SS block to perform initial access with respect to the base station apparatus 100.

Figure 3:
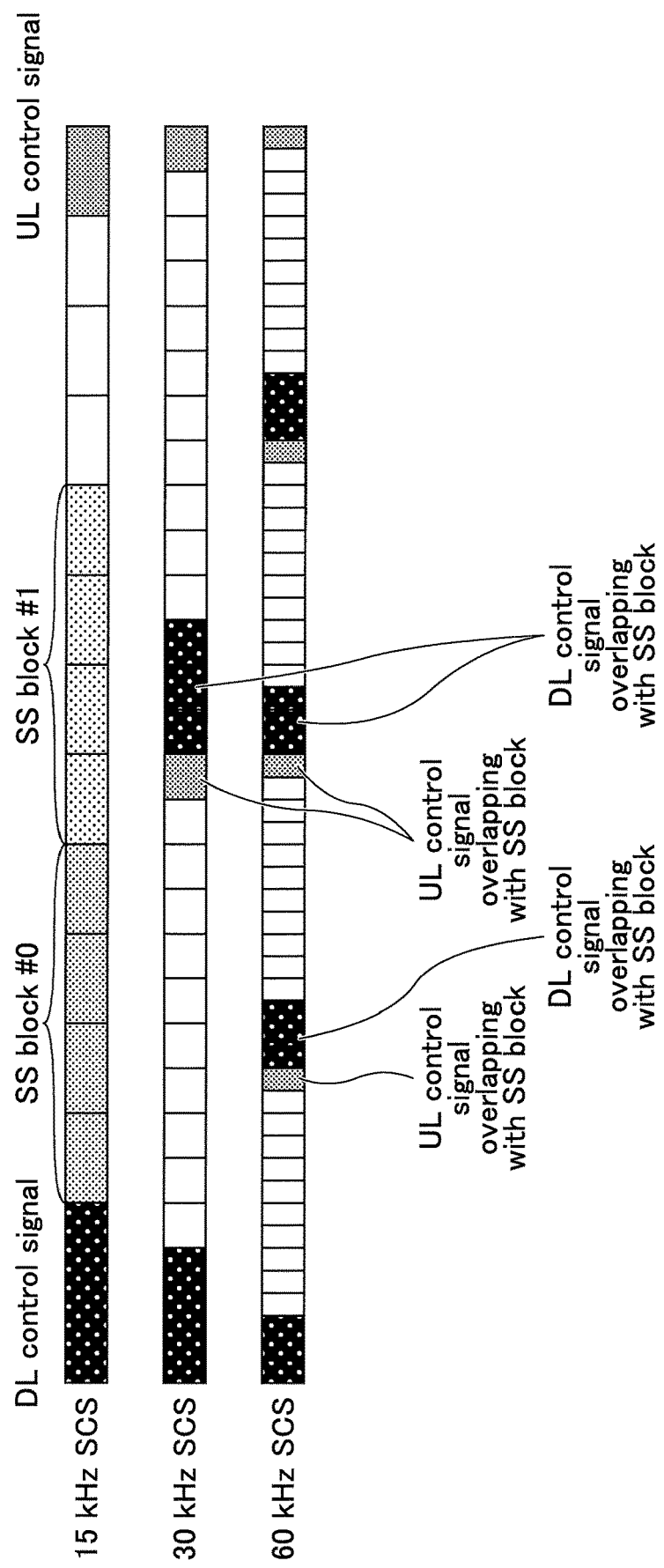
FIG. 3 is a diagram showing a mapping example (1) of SS blocks in different SCSs.

FIG. 3 is a diagram showing a mapping example (1) of SS blocks in different SCSs. FIG. 3 illustrates SCSs of 15 kHz, 30 kHz and 60 kHz, and a mapping of SS blocks to a radio frame of 15 kHz SCS. In the radio frame of 15 kHz SCS, DL control signals are mapped to the first two symbols and a UL control signal is mapped to the last one symbol. As shown in FIG. 3, during the period in which the SS block #0 is mapped to the radio frame of 15 kHz SCS, the UL control signal and the DL control signal are mapped to the radio frame of 60 kHz SCS. Also, during the period in which the SS block #1 is mapped to the radio frame of 15 kHz SCS, the UL control signal and the DL control signal are mapped to the radio frame of 30 kHz SCS, and the UL control signal and the DL control signal are mapped to the radio frame of 60 kHz SCS. The transmission opportunities of the UL control signals and DL control signals mapped during the periods in which the SS blocks are transmitted are obstructed. In the example shown in FIG. 3, control signals mapped to four symbols of the radio frame of 30 kHz SCS, and control signals mapped to eight symbols of the radio frame of 60 kHz SCS overlap with the transmission periods of SS blocks.

Figure 4:
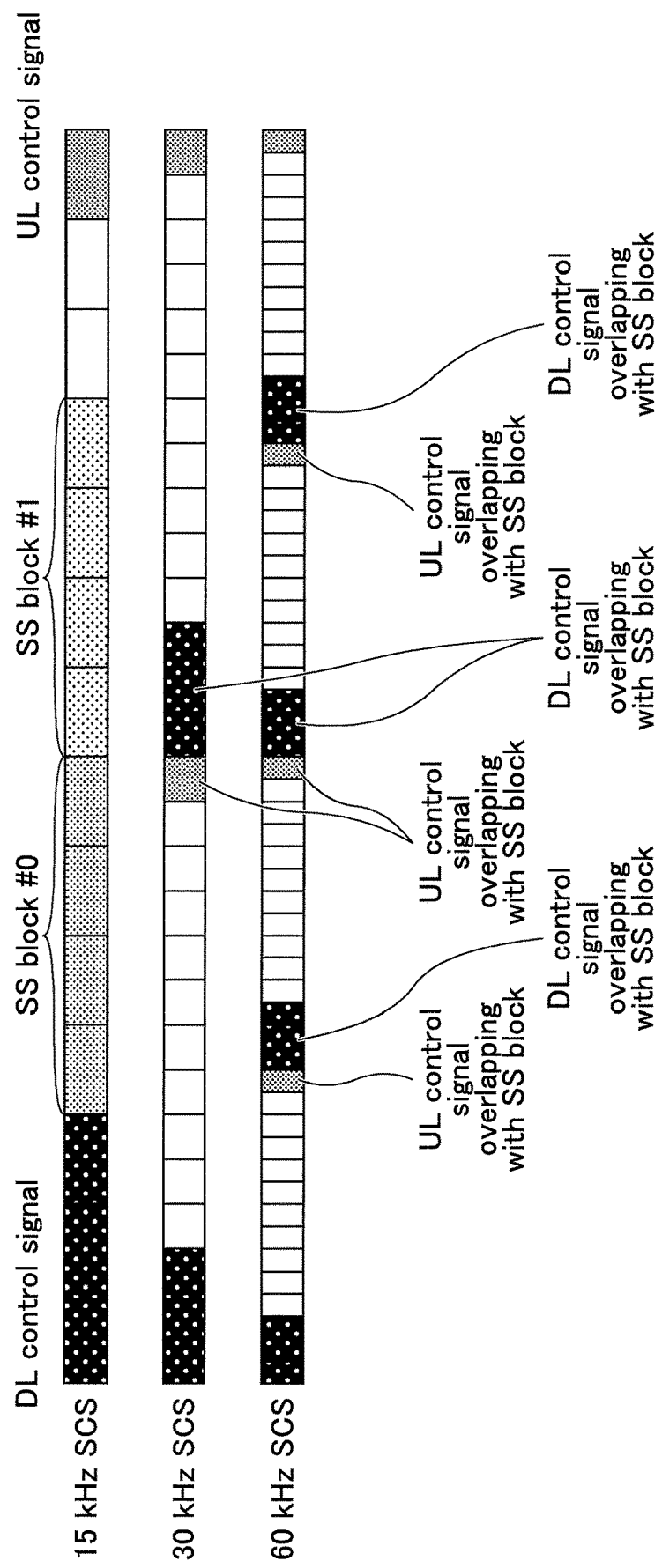
FIG. 4 is a diagram showing a mapping example (2) of SS blocks in different SCSs.

FIG. 4 is a diagram showing a mapping example (2) of SS blocks in different SCSs. As in FIG. 3, FIG. 4 illustrates radio frames with SCSs of of 15 kHz, 30 kHz and 60 kHz, and a mapping of SS blocks in the radio frame of 15 kHz SCS. In the radio frame of 15 kHz SCS, DL control signals are mapped to the first three symbols and a UL control signal is mapped to the last one symbol. As shown in FIG. 4, during the period in which the SS block #0 is mapped to the radio frame of 15 kHz SCS, the UL control signal is mapped to the radio frame of 30 kHz SCS, and the UL control signal and the DL control signal are mapped to the radio frame of 60 kHz SCS. Also, during the period in which the SS block #1 is mapped to the radio frame of 15 kHz SCS, the DL control signal is mapped to the radio frame of 30 kHz SCS, and the UL control signal and the DL control signal are mapped to the radio frame of 60 kHz SCS. The transmission opportunities of the UL control signals and DL control signals mapped during the period in which the SS blocks are transmitted are obstructed. In the example shown in FIG. 4, control signals mapped to four symbols of the radio frame of 30 kHz SCS and control signals mapped to eleven symbols of the radio frame of 60 kHz SCS overlap with the transmission periods of SS blocks.

Example 1

In the following, Example 1 will be described. In the description of Examples 1, 2 and 3 below, improvements to the techniques of the above basic example are described. Thus, with regard to technical aspects that are not specifically described, it may be assumed that the techniques of the basic example are used. Also, note that Examples 1, 2 and 3 may be implemented individually or in combination.

Figure 5:
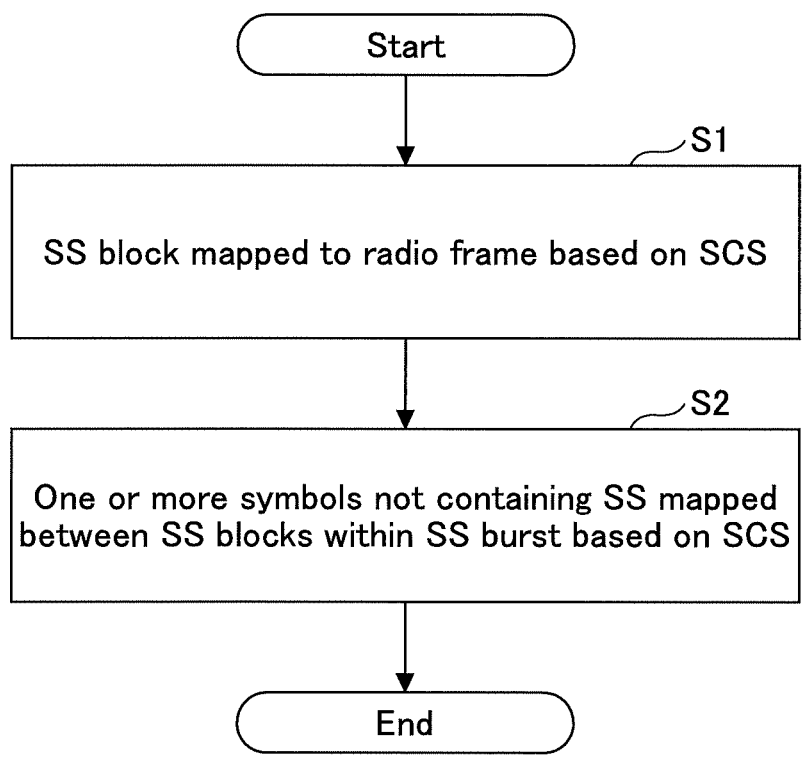
FIG. 5 is a flowchart illustrating a procedure for mapping SS blocks to a radio frame according to an embodiment of the present invention.

FIG. 5 is a flowchart illustrating a procedure of mapping SS blocks to a radio frame according to an embodiment of the present invention.

In step S1, the base station apparatus 100 maps SS blocks to a radio frame based on the SCS. That is, the mapping of the SS blocks to a certain SCS may be different from the mapping of the SS blocks to a different SCS.

In step S2, the base station apparatus 100 arranges one or more symbols between the SS blocks within a SS burst set based on the SCS. Note that the number of symbols arranged may be zero. The transmission opportunities of control signals may be increased during the period in which the symbols are arranged. Note that the transmission opportunity of a control signal refers to the transmission opportunity of a control signal to be transmitted by the base station apparatus 100 or the user apparatus 200 using a radio frame configured with a SCS that is different from the SCS of the radio frame used to transmit the SS blocks.

Note that step S2 represents a mapping example. For example, the base station apparatus 100 may perform mapping according to Example 2, which is described below, or may perform mapping based on some other SCS.

Note that the user apparatus 200 receives the SS blocks mapped to the radio frame by the above-described steps, performs synchronization, acquires information necessary for random access, and performs initial access.

Figure 6:
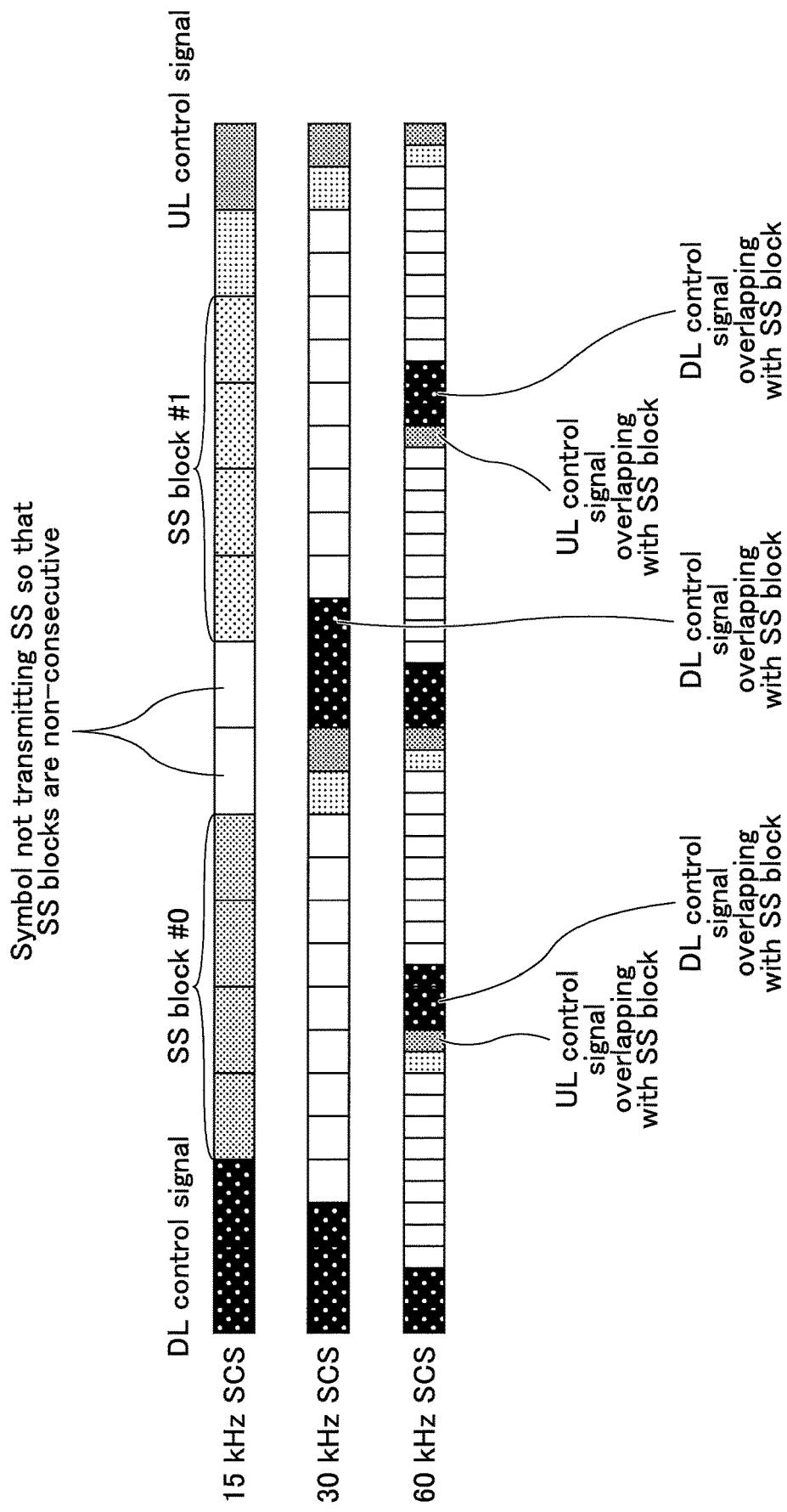
FIG. 6 is a diagram showing a mapping example when SS blocks are transmitted using 15 KHz SCS according to an embodiment of the present invention.

FIG. 6 is a diagram showing a mapping example when SS blocks are transmitted using the 15 KHz SCS according to an embodiment of the present invention. FIG. 6 shows radio frames using three types of SCSs, namely, 15 kHz SCS, 30 kHz SCS, and 60 kHz SCS. As shown in FIG. 6, when SS blocks are transmitted using the 15 kHz SCS, the SS block #0 and the SS block #1 are not mapped consecutively but are mapped so that two symbols are arranged between these SS blocks. With such a mapping, transmission opportunities for transmitting controls signals during the period in which the two symbols are mapped will not be lost in the radio frame with the 30 kHz SCS or the 60 kHz SCS. In the example shown in FIG. 6, a control signal mapped to one symbol of the radio frame of 30 kHz SCS, and control signals mapped to eight symbols of the radio frame of 60 kHz SCS overlap the SS blocks. That is, in the mapping example of SS blocks shown in FIG. 6, the number of symbols for control signals that overlap with SS blocks can be reduced as compared with the mapping examples of SS blocks shown in FIGS. 3 and 4. In other words, the transmission opportunities of control signals are increased.

Note that when SS blocks are mapped to the radio frame as described above, the user apparatus 200 can transmit and receive control signals during the period of the symbols arranged between the SS blocks that do not have SSs mapped thereto.

Figure 7:
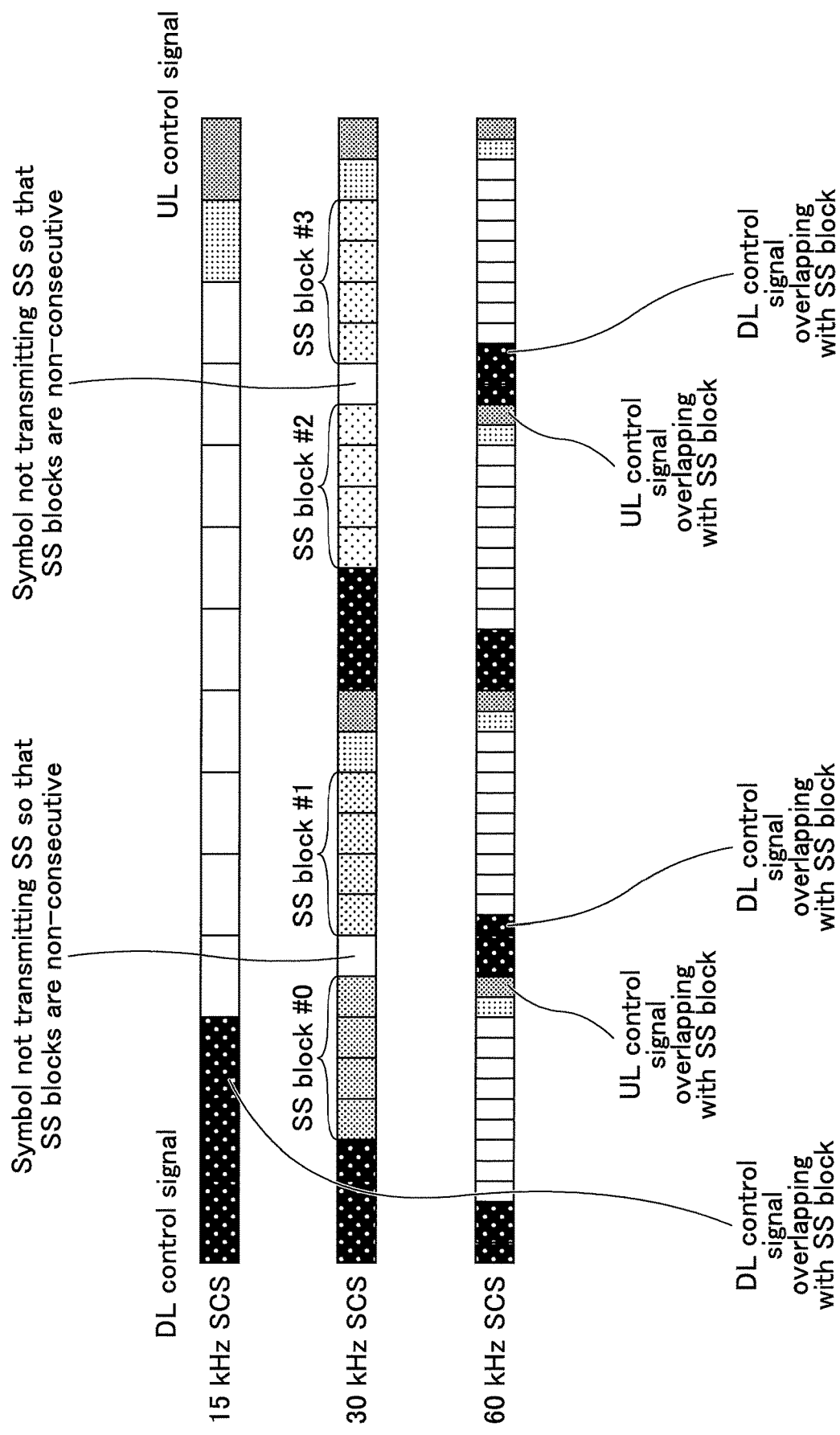
FIG. 7 is a diagram showing a mapping example when SS blocks are transmitted using 30 KHz SCS according to an embodiment of the present invention.

FIG. 7 is a diagram showing a mapping example when SS blocks are transmitted using the 30 KHz SCS according to an embodiment of the present invention. FIG. 7 shows radio frames using three types of SCSs, namely, 15 kHz SCS, 30 kHz SCS, and 60 kHz SCS. As shown in FIG. 7, when SS blocks are transmitted using the 30 kHz SCS, the SS block #0 and the SS block #1 are not mapped consecutively but are mapped so that one symbol is arranged between these SS blocks. Similarly, the SS block #2 and the SS block #3 are not mapped consecutively but are mapped so that one symbol is arranged between these SS blocks. With such a mapping, transmission opportunities for transmitting control signals mapped during the period of the one symbol period will not be lost in the radio frame of 15 kHz SCS or 60 kHz SCS. In the example shown in FIG. 7, control signals mapped to two symbols of the radio frame of 15 kHz SCS and control signals mapped to four symbols of the radio frame of 60 kHz SCS overlap with the SS blocks. For example, assuming that the SS block #0 and the SS block #1 are mapped consecutively, additional DL control signals mapped to four additional symbols of the radio frame of 60 kHz SCS will overlap with the SS blocks.

As in the example of FIG. 6, when SS blocks are mapped to the radio frame as described above, the user apparatus 200 can transmit and receive a control signal during the period of the symbol arranged between the SS blocks that does not have a SS block mapped thereto.

Figure 8:
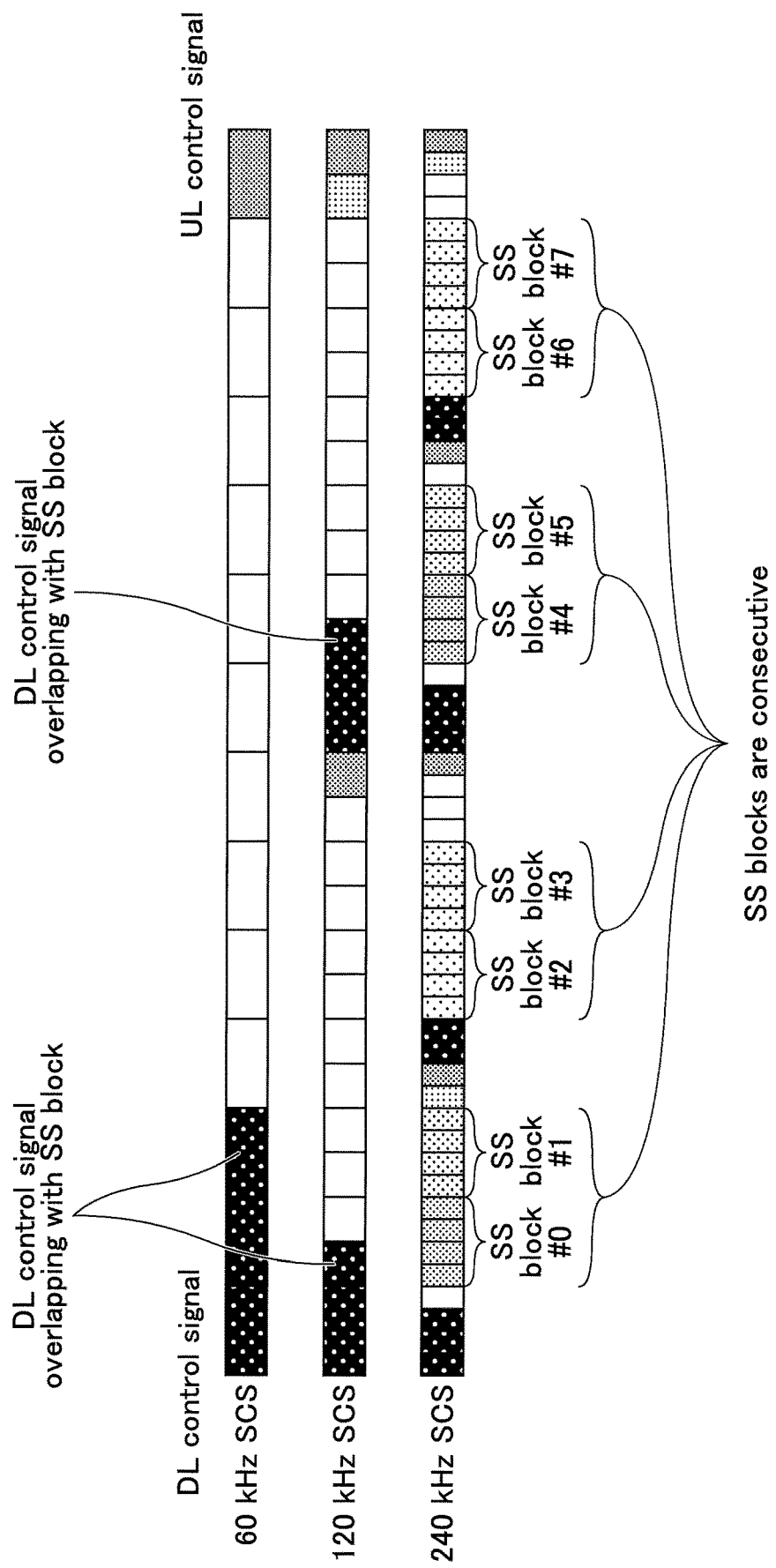
FIG. 8 is a diagram showing a mapping example when SS blocks are transmitted using 240 KHz SCS according to an embodiment of the present invention.

FIG. 8 is a diagram showing a mapping example when SS blocks are transmitted using the 240 KHz SCS according to an embodiment of the present invention. FIG. 8 shows radio frames using three types of SCSs, namely, 60 kHz SCS, 120 kHz SCS, and 240 kHz SCS. As shown in FIG. 8, when SS blocks are transmitted using the 240 kHz SCS, unlike FIGS. 6 and 7, the SS block #0 and the SS block #1 are mapped consecutively, and pairs of SS blocks are consecutively mapped in a similar manner for the SS blocks #2 to #7. In this case, although DL control signals mapped to two symbols of the radio frame of 60 kHz SCS and DL control signals mapped to two symbols of the radio frame of 120 kHz SCS overlap with the SS blocks, the number of symbols for control signals that overlap with the SS blocks is relatively is small.

Note that in the case where SS blocks are discretely mapped in order to increase transmission opportunities of control signals and prevent overlap between SS blocks and control signals, the user apparatus 200 has to provide a search window for observing the discretely mapped SS blocks for a long time, and as such, power consumption may be a concern. In this respect, by mapping the SS blocks based on the SCS as shown in FIG. 8, when relatively few overlaps occur between the SS blocks and the control signals even when the SS blocks are consecutively transmitted, the SS block may be consecutively transmitted so that the user apparatus 200 does not have to lengthen the search window for SS and can thereby reduce power consumption.

According to Example 1 as described above, the base station apparatus 100 maps SS blocks to a radio frame as appropriate based on the SCS in order to enable efficient resource allocation with respect to the transmission of control signals.

Example 2

FIG. 9 is a diagram showing an example setting of the number of SS blocks set up with respect to each SCS according to an embodiment of the present invention. As shown in FIG. 9, the base station apparatus 100 performs mapping by setting up the maximum number of SS blocks that can be mapped within a period of the SS burst set periodicity based on the SCS used to transmit the SS blocks. According to the example of FIG. 9, in a case where the SCS is 15 kHz, the maximum number of SS blocks is 4; in a case where the SCS is 30 kHz, the maximum number of SS blocks is 8; and in cases where the SCS is 120 kHz and 240 kHz, the maximum number of SS blocks is 64.

With respect to the acquisition of specific SS blocks associated with one beam that are necessary for enabling the user apparatus 200 to start communication, the number of SS blocks that need to be arranged per slot is different depending on the SCS. By changing the number of SS blocks per slot depending on the SCS, the user apparatus 200 can receive the SS blocks that need to be received to complete measurement in the same period regardless of the SCS. Thus, the user apparatus 200 can unify the measurement period regardless of the SCS. As a result, the user apparatus 200 can perform efficient measurement.

Figure 10:
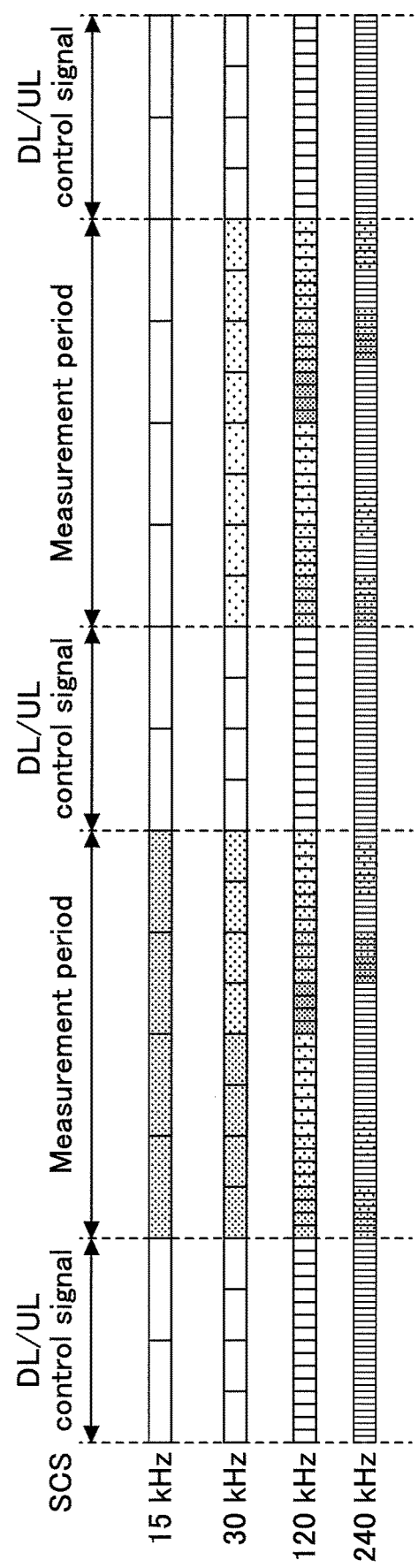
FIG. 10 is a diagram showing an example in which SS blocks are mapped in parallel to radio frames of a plurality of different SCSs according to an embodiment of the present invention.

FIG. 10 is a diagram showing an example in which SS blocks are mapped in parallel to a plurality of radio frames with different SCSs according to an embodiment of the present invention. FIG. 10 shows radio frames with SCSs of 15 kHz, 30 kHz, 120 kHz, and 240 kHz. As shown in FIG. 10, periods during which DL/UL control signals are mapped and periods during which SS blocks are mapped are arranged to be common across the SCSs.

Also, the base station apparatus 100 maps SS blocks to the radio frames having the symbol arrangements as shown in FIG. 10 according to the number of SS blocks per slot based on the SCS as shown in FIG. 9. Further, the base station apparatus 100 controls mapping so that the period during which DL/UL control signal can be arranged and the period during which SS blocks can be arranged are separated from each other. By such mapping, flexibility may be maintained for scheduling DL/UL control signals. In FIG. 10, the number of SS blocks for each SCS as shown in FIG. 9 is set up, and the measurement period for the user apparatus 200 is arranged to be 4 ms across all SCSs.

According to Example 2 as described above, the base station apparatus 100 maps SS blocks to a radio frame as appropriate based on the SCS so that flexibility may be maintained in scheduling control signals and the user apparatus 200 can complete measurement during a common measurement period even when different SCSs are used.

Example 3

Figure 11:
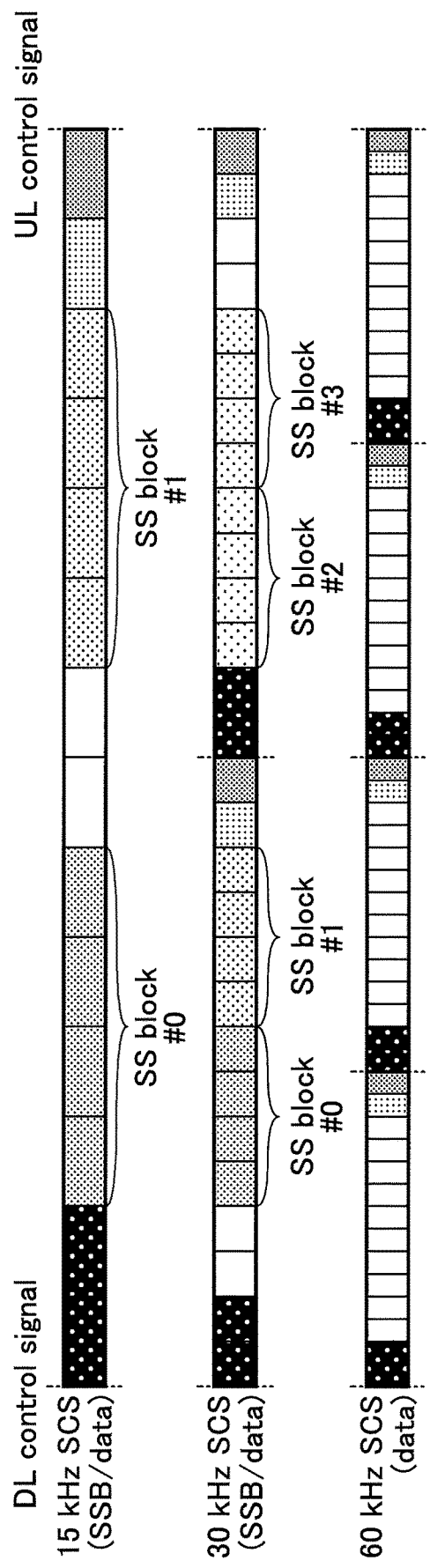
FIG. 11 is a diagram showing a mapping example (1) when SS blocks are transmitted using a plurality of different SCSs according to an embodiment of the present invention.

FIG. 11 is a diagram showing a mapping example (1) when SS blocks are transmitted using a plurality of different SCSs according to an embodiment of the present invention. As a specific arrangement example of mapping SS blocks in parallel to a plurality of radio frames with different SCSs as shown in FIG. 10, FIG. 11 illustrates an example in which SS blocks, data, and DL/UL control signals are mapped to a radio frame with a SCS of 15 kHz SCS and a radio frame with a SCS of 30 kHz. Note that SS blocks are not mapped to a radio frame with a SCS of 60 kHz, but data and DL/UL control signals are arranged in the radio frame.

As shown in FIG. 11, when SS blocks are mapped to a radio frame with a SCS of 30 kHz, in the first slot, the SS block #0 is arranged from the fifth symbol, and the SS block #1 is arranged from the ninth symbol. In the second slot, the SS block #2 is arranged from the third symbol, and the SS block #3 is arranged from the seventh symbol. That is, in a radio frame configured with a certain SCS, different slots of the radio frame are configured to have SS blocks arranged in symbols of different temporal positions. With such an arrangement, in the first slot, gaps that are capable of transmitting DL/UL control signals may be generated in the first four symbols and the last two symbols; and in the second slot, gaps that are capable of transmitting DL/UL control signals may be generated in the first two symbols and the last four symbols. The temporal positions of these gaps coincide with the temporal positions of the first two symbols and the last two symbols of the slot of the radio frame with the 15 kHz SCS and the seventh symbol and the eighth symbol arranged at the center of the slot. Thus, the base station apparatus 100 can generate common gaps that are common across radio frames configured with a plurality of different SCSs and thereby increase the transmission opportunities of control signals.

With respect to the temporal positions of the SS blocks within different slots, the SS block #0 is arranged from the third symbol in the first slot of the radio frame with a SCS of 15 kHz, whereas the SS block #0 is arranged from the fifth symbol in the first slot of the radio from with a SCS of 30 kHz. That is, the temporal positions of SS blocks within a slot may be different in radio frames configured with different SCSs.

Figure 12:
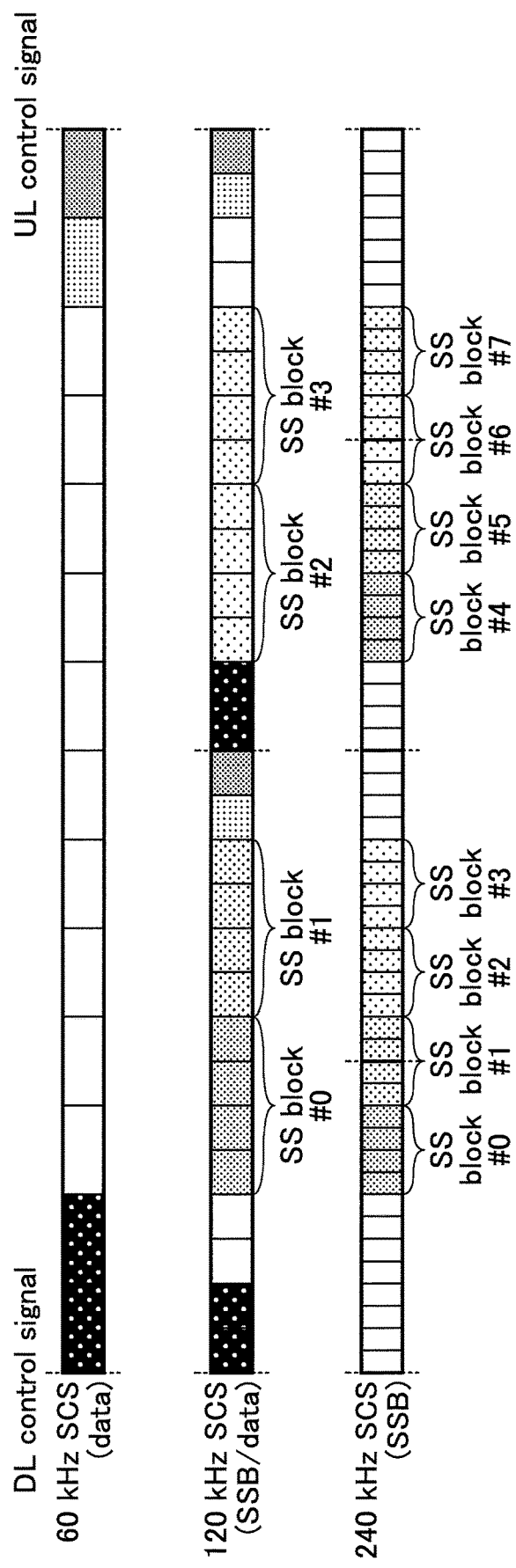
FIG. 12 is a diagram showing a mapping example (2) when SS blocks are transmitted using a plurality of different SCSs according to an embodiment of the present invention.

FIG. 12 is a diagram showing a mapping example (2) when SS blocks are transmitted using a plurality of different SCSs according to an embodiment of the present invention. As a specific arrangement example in which SS blocks are mapped in parallel to a plurality of radio frame with different SCSs, FIG. 12 illustrates an example in which SS blocks, data, and DL/UL control signals are mapped to a radio frame with a SCS of 120 kHz and SS blocks are mapped to a radio frame with a SCS of 240 kHz. Also, as with FIG. 11, SS blocks are not mapped to a radio frame with a SCS of 60 kHz, but data and DL/UL control signals are arranged in the radio frame.

As shown in FIG. 12, when SS blocks are mapped to the radio frame with a SCS of 120 kHz, in the first slot, the SS block #0 is arranged from the fifth symbol, and the SS block #1 is arranged from the ninth symbol. In the second slot, the SS block #2 is arranged from the third symbol, and the SS block #3 is arranged from the seventh symbol. Also, when the SS blocks are mapped to the radio frame with a SCS of 240 kHz, in the first slot, the SS block #0 is arranged from the ninth symbol. In the second slot, the SS block #1 is arranged from the first symbol. Further, SS blocks are arranged consecutively from the ninth symbol of the first slot to the tenth symbol of the second slot. Also, in the third slot, the SS block #4 is arranged from the fifth symbol. In the fourth slot, the SS block #6 is arranged from the first symbol. Further, SS blocks are arranged consecutively from the fifth symbol of the third slot to the sixth symbol of the fourth slot. That is, as with FIG. 11, in a radio frame configured with a certain SCS, different slots of the radio frame have SS blocks arranged in symbols of different temporal positions. Also, by concentrating SS blocks on a time axis, the base station apparatus 100 can enable the user apparatus 200 to quickly complete measurement and can generate common gaps that are common across radio frames configured with a plurality of different SCSs to thereby increase transmission opportunities of control signals. Also, by concentrating SS blocks on a time axis, the first two symbols and the last two symbols in the radio frame with a SCS of 60 kHz can arranged into gaps that can transmit DL/UL control signals.

Figure 13:
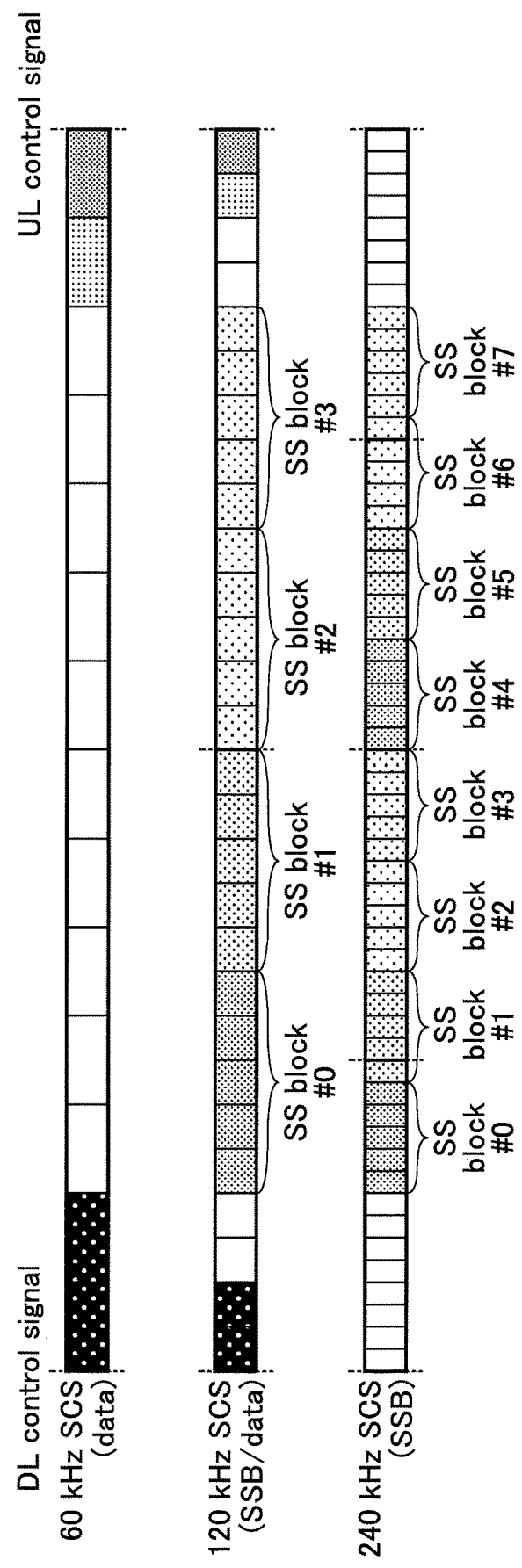
FIG. 13 is a diagram showing a mapping example (3) when SS blocks are transmitted using a plurality of different SCSs according to an embodiment of the present invention.

FIG. 13 is a diagram showing a mapping example (3) when SS blocks are transmitted using a plurality of different SCSs according to an embodiment of the present invention. As a specific arrangement example in which SS blocks are mapped in parallel to radio frames with a plurality of different SCSs, FIG. 13 illustrates an example in which SS blocks, data, and DL/UL control signals are mapped to a radio frame with a SCS of 120 kHz, and SS blocks are mapped to a radio frame with a SCS of 240 kHz. As with FIG. 11, SS blocks are not mapped to a radio frame with a SCS of 60 kHz, but data and DL/UL control signals are arranged in the radio frame. The SS blocks shown in FIG. 13 each consist of 5 symbols.

As shown in FIG. 13, when an SS block is mapped to a radio frame with a SCS of 120 kHz, in the first slot, the SS block #0 is arranged from the fifth symbol, and the SS block #1 is arranged from the tenth symbol. In the second slot, the SS block #2 is arranged from the first symbol, and the SS block #3 is arranged from the sixth symbol. Also, when the SS block is mapped to the radio frame with an SCS of 240 kHz, in the first slot, the SS block #0 is arranged from the ninth symbol. In the second slot, the SS block #1 is arranged from the first symbol. In the third slot, the SS block #4 is arranged from the first symbol. In the fourth slot, the SS block #6 is arranged from the first symbol. Further, in this case, SS blocks are consecutively arranged from the ninth symbol of the first slot to the sixth symbol of the fourth slot. In the case where each SS block consists of five symbols as in the above example, a greater number of SS blocks can be concentrated on a time axis as compared with the case where each SS block consists of four symbols. As such, the base station apparatus 100 can enable the user apparatus 200 to quickly complete measurement and can generate common gaps that are common across radio frames with a plurality of different SCSs to thereby increase transmission opportunities of control signals. Also, by concentrating SS blocks on a time axis, the first two symbols and the last two symbols in the radio frame with a SCS of 60 kHz can arranged into gaps that can transmit DL/UL control signals.

According to Example 3 as described above, when mapping SS blocks to a radio frame configured with a certain SCS, the base station apparatus 100 arranges different slots of the radio frame to have SS blocks mapped to symbols of different temporal positions so that common gaps that are common across radio frames configured with a plurality of different SCSs may be generated and transmission opportunities of control signals may be increased. Also, the base station apparatus 100 concentrates SS blocks on a time axis so that the user apparatus 200 can complete measurement quickly and common gaps that are common across radio frames configured with a plurality of different SCSs may be generated to thereby increase transmission opportunities of control signals.

(Apparatus Configuration)

In the following, example functional configurations of the base station apparatus 100 and the user apparatus 200 that execute the above-described processes and operations will be described. The base station apparatus 100 and the user apparatus 200 each include functions for implementing at least Example 1 and Example 2 described above. However, in some embodiments, the base station apparatus 100 and the user apparatus 200 may only include some of the functions of Example 1 and Example 2.

<Base Station Apparatus 100>

Figure 14:
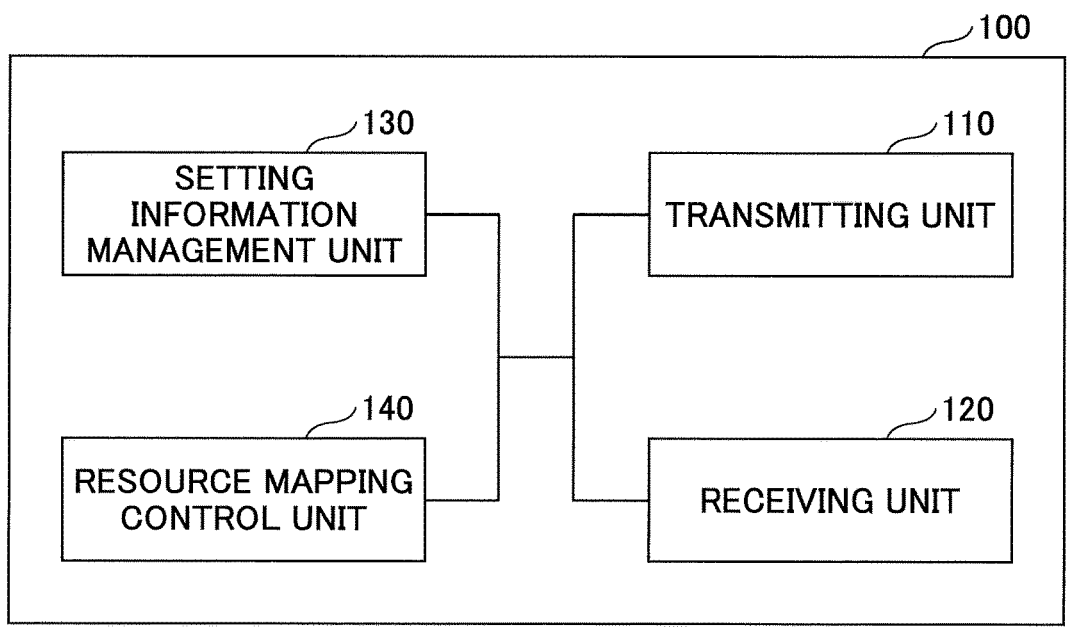
FIG. 14 is a diagram showing an example functional configuration of a base station apparatus 100.

FIG. 14 is a diagram showing an example functional configuration of the base station apparatus 100. As shown in FIG. 14, the base station apparatus 100 includes a transmitting unit 110, a receiving unit 120, a setting information management unit 130, and a resource mapping control unit 140. The functional configuration shown in FIG. 14 is merely one example. That is, the division of functions and the names of functional units are not particularly limited as long as operations according to an embodiment of the present invention can be executed.

The transmitting unit 110 includes functions of generating a signal to be transmitted to the user apparatus 200 and transmitting the signal by radio. The receiving unit 120 includes functions of receiving various signals transmitted from the user apparatus 200 and acquiring information of upper layers from the received signals, for example. Also, the transmitting unit 110 has a function of transmitting NR-PSS, NR-SSS, NR-PBCH, DL/UL control signals and the like to the user apparatus 200.

The setting information management unit 130 stores preset setting information and various setting information to be transmitted to the user apparatus 200. The setting information may include, for example, information relating to the signals NR-PSS and NR-SSS, information included in the NR-PBCH, information relating to the SCS, information relating to the configuration and transmission period of SS blocks included in a SS burst set, information relating to the DL/UL control signals, and the like.

The resource mapping control unit 140 controls mapping of SS blocks to a radio frame by the base station apparatus 100 as described above with reference to the basic example and Examples 1 and 2. The resource mapping control unit 140 also maps control signals, data, and the like to a radio frame. The radio frame subjected to mapping by the resource mapping control unit 140 is used in the transmitting unit 110.

<User Apparatus 200>

Figure 15:
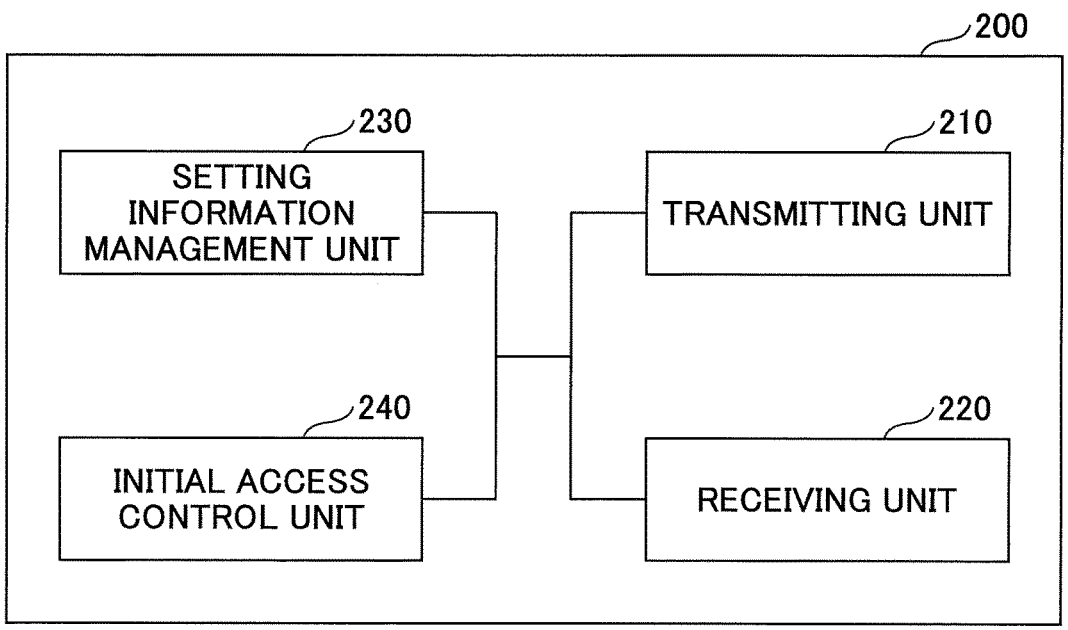
FIG. 15 is a diagram showing an example functional configuration of a user apparatus 200.

FIG. 15 is a diagram showing an example functional configuration of the user apparatus 200. As shown in FIG. 15, the user apparatus 200 includes a transmitting unit 210, a receiving unit 220, a setting information management unit 230, and an initial access control unit 240. The functional configuration shown in FIG. 15 is merely one example. The division of functions and the names of functional units are not particularly limited as long as operations according to an embodiment of the present invention can be executed.

The transmitting unit 210 generates a transmission signal from transmission data and transmits the transmission signal by radio. The receiving unit 220 receives various signals by radio and acquires signals of an upper layer from the received signals of the physical layer. The receiving unit 220 also has a function of receiving NR-PSS, NR-SSS, NR-PBCH, DL/UL control signals and the like that are transmitted from the base station apparatus 100.

The setting information management unit 230 stores various setting information received from the base station apparatus 100 by the receiving unit 220. The setting information management unit 230 also stores preset setting information. The setting information may include, for example, information relating to the signals NR-PSS and NR-SSS, information included in the NR-PBCH, information relating to the SCS, information relating to the configuration and transmission period of SS blocks included in a SS burst set, information relating to the DL/UL control signal, and the like.

The initial access control unit 240 performs control related to initial access by the user apparatus 200 as described above with reference to the basic example and Examples 1 and 2. Note that in some embodiments, a functional unit of the initial access control unit 240 related to signal transmission may be included in the transmitting unit 210 and a functional unit of the initial access control unit 240 related to signal reception may be included in the receiving unit 220.

<Hardware Configuration>

Note that the above functional configuration diagrams (FIG. 14 and FIG. 15) used for describing an embodiment of the present invention show blocks representing functional units. These functional blocks (components) may be implemented by a combination of hardware and/or software. Also, means for implementing the functional blocks are not particularly limited. That is, the functional blocks may be implemented by one apparatus having a plurality of elements that are physically and/or logically integrated, or a plurality of apparatuses including two or more physically and/or logically discrete apparatuses that are directly and/or indirectly (e.g., by wire and/or wirelessly) connected to each other.

Figure 16:
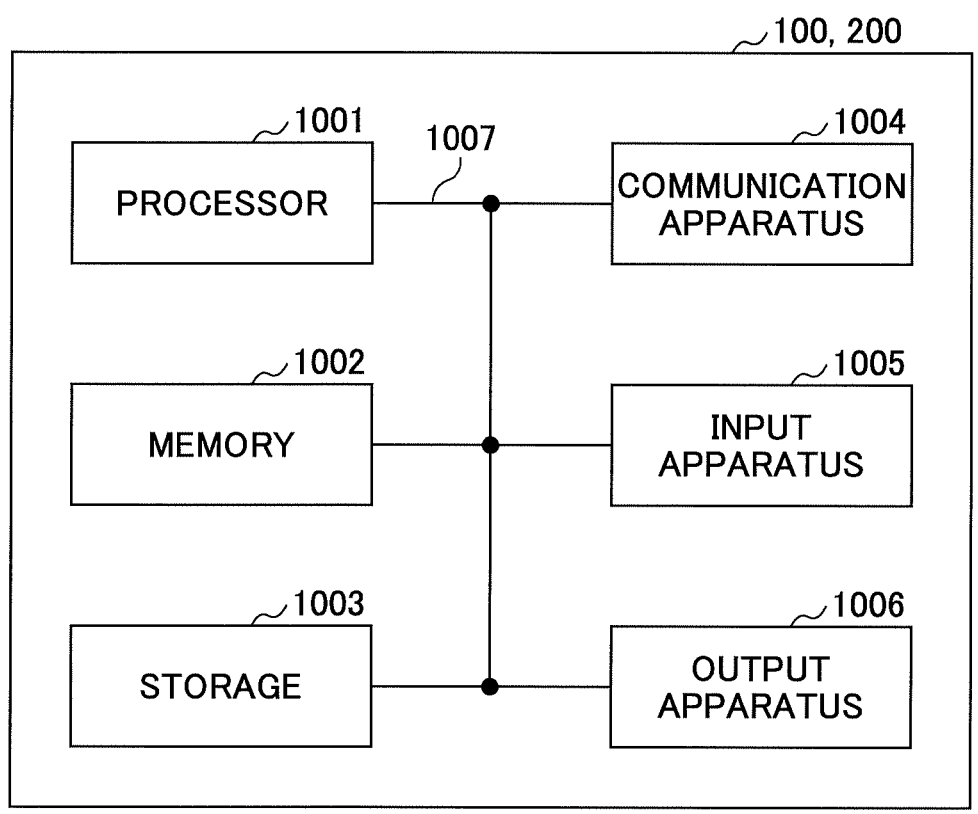
FIG. 16 is a diagram showing example hardware configurations of the base station apparatus 100 and the user apparatus 200.

Also, for example, the base station apparatus 100 and the user apparatus 200 according to an embodiment of the present invention may each function as computers that execute processes according to the present embodiment. FIG. 16 is a diagram showing an example hardware configuration of a radio communication apparatus that may correspond to the base station apparatus 100 or the user apparatus 200 according to an embodiment of the present invention. The above-described base station apparatus 100 and user apparatus 200 may each be physically configured by a computer apparatus including a processor 1001, a memory 1002, a storage 1003, a communication apparatus 1004, an input apparatus 1005, an output apparatus 1006, and a bus 1007, for example.

In the following description, the term "apparatus" can be interpreted to mean a circuit, a device, a unit, and the like. The base station apparatus 100 and the user apparatus 200 may have hardware configurations including one or more of each of the illustrated apparatuses 1001-1006, or hardware configurations in which some of the above apparatuses are omitted, for example.

The functions of the base station apparatus 100 and the user apparatus 200 may be implemented by loading predetermined software (program) in hardware, such as the processor 1001 and the memory 1002, and causing the processor 1001 to perform computations for controlling communication by the communication apparatus 10004 and controlling reading and/or writing of data in the memory 1002 and the storage 1003, for example.

The processor 1001 may run an operating system to control the entire computer, for example. The processor 1001 may be configured by a central processing unit (CPU) including an interface with peripheral devices, a control unit, an arithmetic unit, and a register, for example.

Also, the processor 1001 reads a program (program code), a software module, or data from the storage 1003 and/or the communication apparatus 1004 and loads the read program or data in the memory 1002 to execute various processes based thereon. The program used includes a program for causing a computer to execute at least a part of the operations described in connection with the above embodiments. For example, the transmitting unit 110, the receiving unit 120, the setting information management unit 130, and the resource mapping control unit 140 of the base station apparatus 100 shown in FIG. 14 may be implemented by a control program that is stored in the memory 1002 and run on the processor 1001. Further, for example, the transmitting unit 210, the receiving unit 220, the setting information management unit 230, and the initial access control unit 240 of the user apparatus 200 shown in FIG. 15 may be implemented by a control program that is stored in the memory 1002 and run on the processor 1001. Although execution of the various processes is performed by one processor 1001 in the above description, the processes may be executed simultaneously or sequentially by two or more processors 1001. The processor 1001 may be implemented by one or more chips. Note that the program may be transmitted from a network via an electric communication line.

The memory 1002 is a computer-readable recording medium and may be configured by at least one of a ROM (Read Only Memory), an EPROM (Erasable Programmable ROM), an EEPROM (Electrically Erasable Programmable ROM), and a RAM (Random Access Memory), for example. The memory 1002 may be referred to as a register, a cache, a main memory, or the like. The memory 1002 can store executable programs (program code), software modules, and the like for executing processes according to an embodiment of the present invention.

The storage 1003 is a computer-readable recording medium that may be configured by at least one of an optical disk, such as a CD-ROM (Compact Disc ROM), a hard disk drive, a flexible disk, a magneto-optical disk (e.g., compact disk, digital versatile disk, Blu-ray (registered trademark) disk), a smart card, a flash memory (e.g., card, stick, key drive), a floppy (registered trademark) disk, a magnetic strip, and the like. The storage 1003 may be referred to as an auxiliary storage device. The above-described storage medium may also be a database, a server, or some other suitable medium including the memory 1002 and/or the storage 1003, for example.

The communication apparatus 1004 is hardware (transceiver device) for establishing communication between computers via a wired and/or wireless network and may also be referred to as a network device, a network controller, a network card, a communication module, or the like. For example, the transmitting unit 110 and the receiving unit 120 of the base station apparatus 100 may be implemented by the communication apparatus 1004. Further, the transmitting unit 210 and the receiving unit 220 of the user apparatus 200 may be implemented by the communication apparatus 1004.

The input apparatus 1005 is an input device (e.g., keyboard, mouse, microphone, switch, button, sensor, etc.) that accepts an input from the exterior. The output apparatus 1006 is an output device (e.g., display, speaker, LED lamp, etc.) that performs output to the exterior. Note that in some embodiments, the input apparatus 1005 and the output apparatus 1006 may be integrated (e.g., a touch panel).

Also, the above apparatuses including the processor 1001, the memory 1002, and the like are connected to each other by a bus 1007 for exchanging information. The bus 1007 may be configured by a single bus or may include different buses for different apparatuses, for example.

The base station apparatus 100 and the user apparatus 200 may each include hardware, such as a microprocessor, a digital signal processor (DSP), an application specific integrated circuit (ASIC), a programmable logic device (PLD), a field programmable gate array (FPGA), or the like, and some or all of the above functional blocks may be implemented by such hardware. For example, the processor 1001 may be implemented by at least one of the above hardware elements.

Summary of Embodiments

As described above, according to an embodiment of the present invention, a base station apparatus that communicates with a plurality of user apparatuses is provided. The base station apparatus includes a transmitting unit that transmits a plurality of radio signals to the plurality of user apparatuses, and a control unit that arranges a periodic block including a synchronization signal and system information in one or a plurality of radio signals of the plurality of radio signals based on a subcarrier spacing of the radio signal.

With the above configuration, in a radio communication system including the base station apparatus and the user apparatuses, the base station apparatus can appropriately arrange a periodic block including a synchronization signal and system information in a radio signal to achieve efficient resource allocation.

Further, the block may be arranged in the plurality of radio signals such that a transmission opportunity of a control signal to be transmitted by the base station apparatus or the user apparatus is increased. With the above configuration, transmission opportunities of control signals can be increased and efficient communication may be enabled.

Further, in the radio signal having the periodic block arranged therein, a first block and a second block to be arranged immediately after the first block may be discretely arranged. With the above configuration, greater flexibility may be allowed in resource allocation, overlap with control signals may be prevented.

Further, in the radio signal having the periodic block arranged therein, one or a plurality of symbols not including a synchronization signal may be arranged between a third block and a fourth block to be arranged immediately after the third block based on the subcarrier spacing. With the above configuration, the number of symbols not transmitting blocks that are arranged between one block and another block may be changed depending on the subcarrier spacing, and control signals may be transmitted during the period of these symbols.

Further, the block may be arranged in the plurality of radio signals such that a period during which the block is arranged and a period during which a control signal to be transmitted by the base station apparatus or the user apparatus is arranged are separated from one another. With the above configuration, common gaps that are common across a plurality of radio signals configured with different subcarrier spacings may be provided, and greater flexibility may be allowed in the arrangement of control signals.

Further, in the radio signal having the periodic block arranged therein, a number of blocks arranged within a predetermined period and positions of symbols in which the blocks are arranged may be based on the subcarrier spacing; and in each of the plurality of radio signals having the periodic block arranged therein, the same number of blocks associated with one beam that are necessary for the user apparatus to start communication may be arranged within the predetermined period. With the above configuration, the user apparatus can perform an operation for starting communication during a unified common period with respect to a plurality of radio signals configured with different subcarrier spacings so that an efficient initial access operation can be performed.

Additional Embodiments

Although the present invention has been described above with respect to certain embodiments, the present invention is not limited to these embodiments, and other example variations, modifications, substitutions, and replacements would be obvious to those skilled in the art in view of the present disclosure. Although explanations were made using specific numerical values as examples in order to facilitate understanding of the present invention, unless otherwise specified, these numerical values are merely examples and any suitable value may be used in place thereof. The classification of items in the above description is not essential to the present invention, and aspects described in two or more items may be used in combination as appropriate, and an aspect described in one item may be applied in a different item (to the extent practicable). The boundaries of the functional units or process units in the functional block diagrams do not necessarily correspond to the boundaries of physical components. The operations of a plurality of functional units may be physically performed by one component or the operation of one functional unit may be physically performed by a plurality of components, for example. With respect to the process procedures described in connection with the above embodiments, the order of processes may be altered as long as inconsistencies do not arise. For convenience of explanation, the base station apparatus 100 and the user apparatus 200 have been described using functional block diagrams, but these apparatuses may be implemented by hardware, software, or a combination thereof. Note that software that is run by a processor of the base station apparatus 100 according to an embodiment of the present invention, and software that is run by a processor of the user apparatus 200 according to an embodiment of the present invention may be stored in any suitable storage medium, such as a random access memory (RAM), a flash memory, a read-only memory (ROM), an EPROM, an EEPROM, a register, a hard disk (HDD), a removable disk, a CD-ROM, a database, a server, and the like.

Also, the method used for communication of information is not limited to the aspects/embodiments described in the present description, and some other suitable method may be used. For example, the communication of information may be implemented using physical layer signaling (e.g., DCI (Downlink Control Information), UCI (Uplink Control Information)), upper layer signaling (e.g., RRC (Radio Resource Control) signaling), MAC (Medium Access Control) signaling, broadcast information (MIB (Master Information Block), SIB (System Information Block)), other signals, or a combination of the above. Also, note that RRC signaling may be referred to an RRC message, which may be, for example, an RRC connection setup message, an RRC connection reconfiguration message, or the like.

The aspects/embodiments described in the present descriptions may be applied to LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-Wide Band), Bluetooth (registered trademark), systems using other suitable systems and/or next generation systems extended based on these systems.

Further, the order of processes, sequences, flowcharts representing aspects/embodiments of the present invention described in the present description may be altered as long as inconsistencies do not arise. For example, with respect to the methods described herein, although various step elements are presented in an exemplary order, the present invention is not limited to the specific order presented.

Also, specific operations performed by the base station apparatus 100 in the present description may be performed by an upper node in some cases. With respect to various operations performed for communicating with the user apparatus 200 in a network made up of one or more network nodes including the base station apparatus 100 apparatus, it is apparent that these operations may be performed by the base station apparatus 100 and/or another network node other than the base station apparatus 100 (e.g., MME or S-GW, but not limited thereto). Although one network node other than the base station apparatus 100 is illustrated in the above example, a combination of a plurality of other network nodes (e.g., MME and S-GW) may be used.

The aspects/embodiments described in the present description may be implemented individually, in combination, or switched according to execution, for example.

The user apparatus 200 may be referred to by those skilled in the art as a subscriber station, a mobile unit, a subscriber unit, a wireless unit, a remote unit, a mobile device, a wireless device, a wireless communication device, a remote device, a mobile subscriber station, an access terminal, a wireless terminal, a remote terminal, a handset, a user agent, a mobile client, a client, or some other suitable term.

The base station apparatus 100 may be referred to by those skilled in the art as NB (Node-B), eNB (enhanced Node-B), gNB (Next Generation Node-B), a base station, or some other suitable term.

As used in the present description, the term "determining" may encompass a wide variety of actions. For example, the term "determining" may include the execution of actions, such as judging, calculating, calculating, computing, processing, deriving, investigating, looking up (e.g., looking up a table, database, or other data structure), ascertaining, and the like. Also, the term "determining" may include the execution of actions, such as receiving (e.g., receiving information), transmitting (e.g., transmitting information), inputting, outputting, accessing (e.g., accessing data in a memory), and the like. Also, the term "determining" may include execution of actions, such as resolving, selecting, choosing, establishing, comparing, and the like. In other words, the term "determining" may include deeming that some type of action has been determined.

As used in the present description, the phrase "based on" is not to be construed as meaning "based only on" unless explicitly stated otherwise. In other words, the phrase "based on" means both "based only on" and "based on at least".

As used in the present description or claims, the terms "include", "including", and variations thereof are intended to cover non-exclusive inclusion in a manner similar to the term "comprising". Further, the term "or" used in the present description or claims is not intended to denote an exclusive disjunction.

In the present disclosure, if articles are added by translation, such as "a" or "an" in English, for example, unless the context otherwise clearly indicates, these articles are intended to include the singular as well as the plural.

Note that a signal configured with one SCS and including a plurality of radio frames in the time direction is an example of a radio signal. The resource mapping control unit 140 is an example of a control unit. A plurality of symbols to which one SS block is mapped or one SS block is an example of a block.

Although the present invention has been described in detail above, it will be obvious to those skilled in the art that the present invention is not limited to the embodiments described herein. The present invention can be implemented as variations and modifications without departing from the spirit and scope of the present invention as claimed. The present description is for the purpose of illustration and it not to be construed to have any restrictive meaning to the present invention.

The present application is based on and claims the benefit of priority of International Application No. PCT/JP2017/017317 filed on May 2, 2017, the entire contents of which are hereby incorporated by reference.

DESCRIPTION OF REFERENCE NUMERALS 100 base station apparatus
200 user apparatus 110 transmitting
120 receiving unit
130 setting information management unit
140 resource mapping control unit
200 user apparatus
210 transmitting unit
220 receiving unit
230 setting information management unit
240 initial access control unit
1001 processor
1002 memory
1003 storage
1004 communication apparatus
1005 input apparatus
1006 output apparatus

The invention claimed is:

1. A terminal that performs communication with a base station apparatus, the terminal comprising:
   a receiver configured to receive cyclic blocks including a synchronization signal and system information in first radio frame configured at first subcarrier spacing from among a plurality of radio frames configured at different subcarrier spacings from each other; and
   a processor configured to determine a symbol to which the cyclic blocks are mapped in the first radio frame based on the first subcarrier spacing,
   wherein the first radio frame and second radio frame configured at second subcarrier spacing from among the plurality of radio frames have a common time domain gap on which the cyclic blocks are not placed,
   the processor is configured to receive a control signal on a symbol included in the gap,
   wherein subcarrier spacings include 15 kHz, 30 kHz, 120 kHz, and 240 kHz,
   wherein a period during which the cyclic blocks are mapped is arranged to be common across the subcarrier spacings,
   wherein the gaps are commonly arranged over a plurality of subcarrier intervals and wherein the gaps are co-located over the plurality of subcarrier intervals,
   wherein the first radio frame has the gap on two symbols at each top of one or more consecutive slots, and
   wherein the second radio frame has the gap on four symbols at each top of one or more consecutive slots.

2. The terminal as claimed in claim 1, wherein the receiver is configured to receive a control signal on the two symbols at each top of one or more consecutive slots in the first radio frame.

3. The terminal as claimed in claim 1, wherein the receiver is configured to receive a control signal on the two symbols at each top of one or more consecutive slots in the second radio frame.

4. The terminal as claimed in claim 1, wherein a location of symbols of the cyclic block on a slot in the second radio frame is different from a location of symbols of the cyclic block on another slot in the second radio frame.

5. The terminal as claimed in claim 1, wherein the cyclic blocks in the second radio frame are placed at high density in time domain.

6. A base station apparatus that performs communication with a terminal, the base station apparatus comprising:
   a transmitter configured to transmit cyclic blocks including a synchronization signal and system information in first radio frame configured at first subcarrier spacing from among a plurality of radio frames configured at different subcarrier spacings from each other; and
   a processor configured to determine a symbol the cyclic blocks is mapped to in the first radio frame based on the first subcarrier spacing,
   wherein the first radio frame and second radio frame configured at second subcarrier spacing from among the plurality of radio frames have a common time domain gap on which the cyclic blocks are not placed,
   the processor is configured to transmit a control signal on a symbol included in the gap,
   wherein subcarrier spacings include 15 kHz, 30 kHz, 120 kHz, and 240 kHz,
   wherein a period during which the cyclic blocks are mapped is arranged to be common across the subcarrier spacings,
   wherein the gaps are commonly arranged over a plurality of subcarrier intervals and wherein the gaps are co-located over the plurality of subcarrier intervals,
   wherein the first radio frame has the gap on two symbols at each top of one or more consecutive slots, and
   wherein the second radio frame has the gap on four symbols at each top of one or more consecutive slots.

7. A communication method performed by a terminal in a mobile communication system, the communication method comprising:
   receiving cyclic blocks including a synchronization signal and system information in first radio frame configured at first subcarrier spacing from among a plurality of radio frames configured at different subcarrier spacings from each other; and
   determining a symbol the cyclic blocks is mapped to in the first radio frame based on the first subcarrier spacing,
   wherein the first radio frame and second radio frame configured at second subcarrier spacing from among the plurality of radio frames have a common time domain gap on which the cyclic blocks are not placed,
   receiving a control signal on a symbol included in the gap,
   wherein subcarrier spacings include 15 kHz, 30 kHz, 120 kHz, and 240 kHz,
   wherein a period during which the cyclic blocks are mapped is arranged to be common across the subcarrier spacings,
   wherein the gaps are commonly arranged over a plurality of subcarrier intervals and wherein the gaps are co-located over the plurality of subcarrier intervals,
   wherein the first radio frame has the gap on two symbols at each top of one or more consecutive slots, and
   wherein the second radio frame has the gap on four symbols at each top of one or more consecutive slots.

* * * * *